United States Patent
Pham et al.

(10) Patent No.: US 8,534,339 B2
(45) Date of Patent: *Sep. 17, 2013

(54) LIGHTWEIGHT FLEXIBLE MANDREL AND METHOD FOR MAKING THE SAME

(75) Inventors: Doan Dinh Pham, Tacoma, WA (US); Mark William Tollan, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,489

(22) Filed: Oct. 12, 2011

(65) Prior Publication Data

US 2013/0092323 A1  Apr. 18, 2013

(51) Int. Cl.
*B28B 7/30* (2006.01)

(52) U.S. Cl.
USPC ........ 156/500; 156/245; 156/583.3; 264/313; 425/393; 425/403

(58) Field of Classification Search
USPC ................ 425/393, 403; 264/313; 156/173, 156/242, 245, 382, 500, 581, 583.3; 428/573, 428/574, 575
See application file for complete search history.

(56) References Cited

U.S. PATENT DOCUMENTS

| | | | |
|---|---|---|---|
| 3,795,559 A * | 3/1974 | Horn et al. | 156/152 |
| 4,075,881 A * | 2/1978 | Kreidler | 72/270 |
| 4,475,976 A | 10/1984 | Mittelstadt et al. | |
| 4,681,724 A | 7/1987 | Faiz et al. | |
| 4,976,490 A * | 12/1990 | Gentle | 296/183.1 |
| 5,387,098 A * | 2/1995 | Willden | 425/393 |
| 5,924,193 A | 7/1999 | Crumly et al. | |
| 6,059,369 A | 5/2000 | Bateson et al. | |
| 7,357,166 B2 * | 4/2008 | Pham et al. | 156/382 |
| 7,901,531 B2 * | 3/2011 | Pham et al. | 156/245 |
| 2006/0062973 A1 * | 3/2006 | Wilson | 428/188 |
| 2007/0261788 A1 * | 11/2007 | Stenard | 156/307.1 |
| 2008/0257490 A1 | 10/2008 | Jones et al. | |
| 2010/0000667 A1 * | 1/2010 | Funnell | 156/189 |
| 2010/0006739 A1 * | 1/2010 | Robins et al. | 249/64 |

FOREIGN PATENT DOCUMENTS

| | | |
|---|---|---|
| DE | 2557991 A1 | 6/1977 |
| DE | 3707634 C1 | 7/1988 |
| EP | 0170178 B1 | 5/1989 |
| WO | W02013055477 A2 | 4/2013 |

\* cited by examiner

*Primary Examiner* — William Bell
(74) *Attorney, Agent, or Firm* — Yee & Associates, P.C.

(57) ABSTRACT

A mandrel for processing a part comprises an outer sleeve and a generally flexible inner core. The outer sleeve includes at least one flexible portion along its length allowing the sleeve to flex to a desired contour.

15 Claims, 4 Drawing Sheets

LIGHTWEIGHT FLEXIBLE MANDREL AND METHOD FOR MAKING THE SAME

BACKGROUND INFORMATION

1. Field

The present disclosure generally relates to tooling used to fabricate parts, especially those made of composites, and deals more particularly with a lightweight flexible mandrel that conforms to local contours of a part.

2. Background

Mandrels may be used to layup, compress and/or cure a variety of parts that may possess one or more curves, contours or surface features to which the mandrel must conform. For example, in the aircraft industry, stringers used in the fuselage or wings may be required to conform to composite skins that may be contoured and/or have surface features such as localized ply pad-ups or drop-offs.

In the past, mandrels have been formed from flexible composites that allow the mandrel surface conform to part contours. However composite mandrels are subject to damage during handling and may have a limited lifespan due to tool surface wear in higher production run applications. Metal type mandrels can be fabricated with geometries necessary to match part contours, however this type of tooling is relatively expensive to produce. In addition, metal mandrels having the necessary rigidity are relatively heavy and may require the use of an overhead crane or special equipment for handling them.

Accordingly, there is a need for a lightweight, flexible mandrel that readily conforms to local part contours and which may be easily handled without the need for cranes or special equipment. There is also a need for a lightweight flexible mandrel that is easily fabricated at low cost, is durable, and produces smooth part surface finishes.

SUMMARY

The disclosed embodiments provide a lightweight, flexible mandrel that is suitable for laying up, compacting and/or curing composite parts, such as relatively long composite stringers having one or more localized surface contours. The mandrel includes a durable, metallic outer sleeve, and an inner core formed of a lightweight flexible filler material, such as a flexible polymer. The outer sleeve may comprise a relatively thin-walled channel member provided with a plurality of slots passing through one or more of the sleeve walls. The slots provide the mandrel with the degree of flexibility needed at selected locations to conform to localized part contours or features, such as ply pad-ups and ply drop-offs. The use of a lightweight, flexible inner core may allow the mandrel to be handled and placed without overhead cranes or special handling equipment. The outer metal sleeve provides durable tool surfaces that have a long service life and may produce relatively smooth surface finishes. The use of a thin metal outer sleeve and low density inner core results in the mandrel absorbing less heat during the cure process which may reduce overall energy consumption, and provide shorter heat-up and cool-down times.

According to one disclosed embodiment, a mandrel is provided for processing a part. The mandrel comprises an outer sleeve having at least one flexible portion along its length allowing the sleeve to flex to a desired contour, and a generally flexible inner core within the sleeve. The outer sleeve is metal and may have a cross section that is substantially U-shaped. The inner core may include one of a structural foam, an elastomer and a composite laminate. The outer sleeve may includes at least 3 sides, and the flexible portion of the sleeve includes a plurality of spaced apart, generally parallel slots in one of the sides of the outer sleeve. The side having the slots therein is connected to the other two of the three sides by a pair of radiused edges According to another embodiment, a lightweight, flexible mandrel is provided for use in fabricating a composite part. The mandrel comprises an elongate metal channel member having outer sides on which a composite part layup may be placed. The channel member has a substantially U-shaped cross section defining an internal cavity and a plurality of slots in one of the sides allowing the side to flex to a desired contour during compaction of the part layup. The mandrel further comprises a generally flexible inner core substantially filling the internal cavity of the channel member and structurally supporting the sides of the channel member. The channel member comprises an alloy comprising nickel and iron with the chemical composition name 64FeNi., and the inner core may include one of a structural foam, an elastomer and a composite laminate. The slots may extend only along a portion of the length of the side having the slots therein. The side having the slots therein is connected to the other of the sides by radiused edges and the slots extend through the radiused edges.

According to still another embodiment, a method is provided of fabricating a flexible mandrel for processing a part. The method comprises forming an outer sleeve, locating a flexible core inside the outer sleeve, and forming slots in the outer sleeve along at least a portion of the sleeve's length that allow the sleeve to flex to a desired contour.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
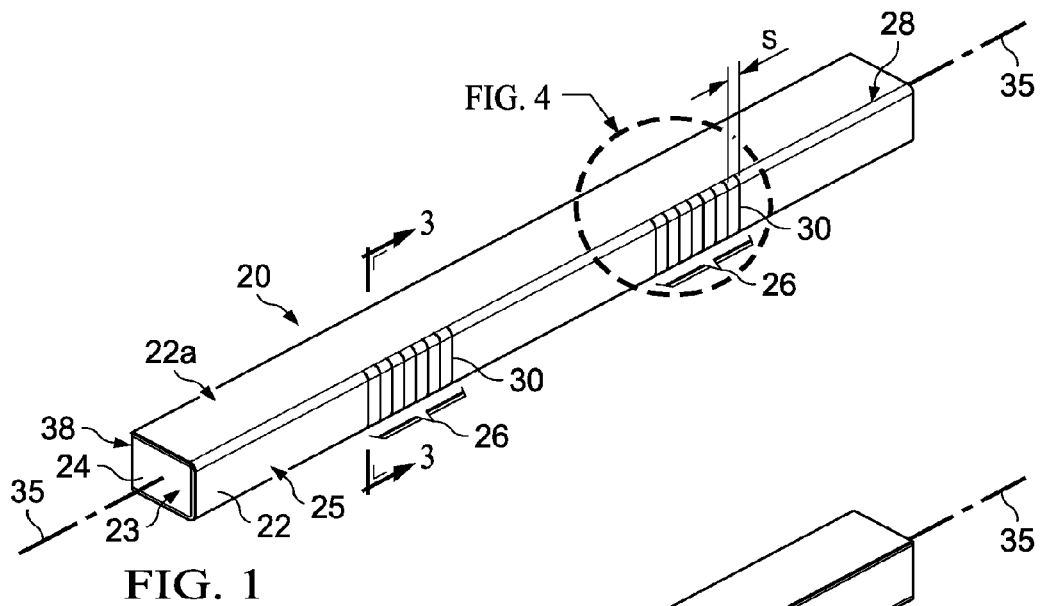
FIG. 1 is an illustration of a perspective view of a lightweight, flexible mandrel according to the disclosed embodiments.

Referring first to FIGS. 1-4, a lightweight, flexible mandrel 20 broadly comprises an outer metal sleeve 22 and a lightweight, flexible inner core 24. The outer sleeve 22 may comprise a channel member 22a that is generally U-shaped in cross section defining an interior cavity 23, however other cross sectional shapes are possible, including for example and without limitation, a truncated U-shape with up-standing legs (not shown). In some applications the channel member 22a may be a closed tubular channel. The outer sleeve 22 has an outer tool surface 25 formed by top, side and bottom walls 32, 34, 36 of the channel member 22a. Top and bottom walls 32, 34 respectively, are each connected to the side wall 34 by a radiused edge 28 having a radius $R_1$. The sleeve 22 may be formed of any of a variety of suitable, relatively thin-walled metals commonly used for durable tooling, such as an alloy comprising nickel and iron with the chemical composition name 64FeNi.

The inner core 24 substantially fills the inner cavity 23 of the channel member 22a and may comprise any suitable, lightweight material that is relatively flexible and yet possesses the stiffness needed to maintain the dimensions of the outer sleeve 22 and react forces applied to the mandrel 20 during vacuum bag compaction and/or autoclave processing. The material from which the core 24 or formed may comprise a suitable polymer such as, without limitation, an elastomeric rubber such as RTV silicone, a carbon foam or a closed cell foam, a flexible ceramic or a composite such as CFRP (carbon fiber reinforced plastic), capable of retaining its desired properties when subjected to the temperatures and pressures of the application, such as the temperatures and pressures experienced during curing within an autoclave (not shown).

The mandrel 20 may include one or more portions 26 along its length that are flexible, allowing the tool surface 25 on sidewall 34 to flex to one or more desired contours related to surface features (not shown) of a part (not shown). For convenience of description, the terms "contour" and "contours" as used herein is defined as including localized curves, contours, joggles, complex contours, ply pad-ups and ply dropoffs, steps and other ply variations and surface features to which the mandrel 20 may conform. The flexible portions 26 of the mandrel 20 are formed by a plurality of spaced apart, generally parallel slots 30 in sidewall 34, that extend substantially orthogonal to the longitudinal axis 35 of the mandrel 20. The sidewall 34 may have a wall thickness T that is suitable for the application, and may or may not be same thickness as that of the top and bottom walls 32, 36 respectively.

In the illustrated embodiment, the slots 30 extend through the sidewall 34, into the mandrel 20 to a depth D (FIG. 3) that is generally substantially equal to the radius $R_1$ of the edges 28. However, the slot depth D may vary, depending upon the application, and may or may not be substantially equal to the radius $R_1$ of the edge 28, in other applications, depending upon the configuration and geometry of the part being formed. In applications where additional flexibility of the mandrel 20 is desired, the depth D of the slots 30 may be greater than the radius $R_1$, such that the slots 30 extend into the top and bottom walls 32, 36, respectively. It should also be noted here that it may be possible to provide the top and/or bottom walls 32, 36 with slots 30 (not shown) in order to allow the mandrel to flex in multiple directions relative to its longitudinal axis 35 (FIG. 1). Although not shown in the Figures, the outer sleeve 22 may include one or more integral contours, tapers or steps conforming to the geometry of a part, which may be formed by any suitable process, such as, without limitation, hydroforming.

Figure 2:
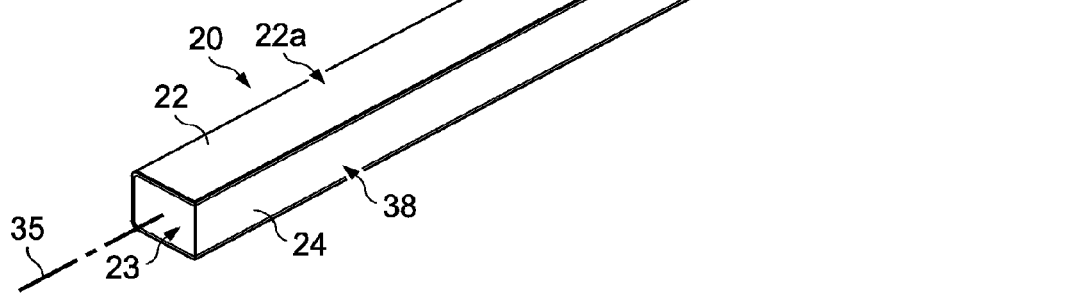
FIG. 2 is an illustration of a perspective view similar to FIG. 1 but showing the opposite side of the mandrel.
Figure 3:
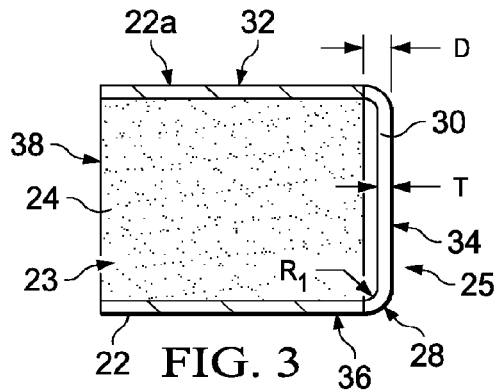
FIG. 3 is an illustration of a sectional view taken along the line 3-3 in FIG. 1.
Figure 4:
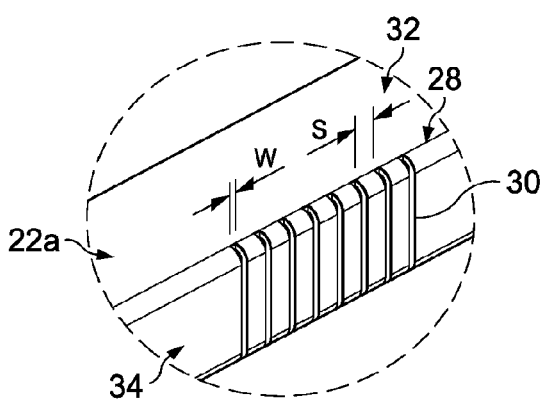
FIG. 4 is an illustration of the area designated as FIG. 4 in FIG. 1.

As best seen in FIG. 4, the slots 30 each have a preselected width W, and are spaced apart from each other a distance S such that the mandrel 20 has the desired amount of flexibility to conform to contours of a part. Depending on the depth D, and the location and/or number of the slots 30, the mandrel 20 may twist to some degree along its longitudinal axis 35 (FIG. 1) in response to applied torsional forces. As shown in FIG. 2, the back 38 of the channel member 22a is generally open in order to reduce the weight of the mandrel 20 while facilitating assembly of the sleeve 22 and the core 24, however, in other embodiments the channel member 22a may have a cross sectional shape that is closed, rather than open along one side. In one practical embodiment, the channel member 22a may be formed of an alloy comprising nickel and iron with the chemical composition name 64FeNi. with a cross sectional area of approximately 2.5 inches by 4.0 inches, and a wall thickness T of approximately 0.062 inches. In this particular example, the radii $R_1$ may each be approximately 0.250 inches. The slots 30 are approximately 0.005 inches wide, 0.250 inches deep and are spaced apart from each other approximately 2 inches.

Figure 5:
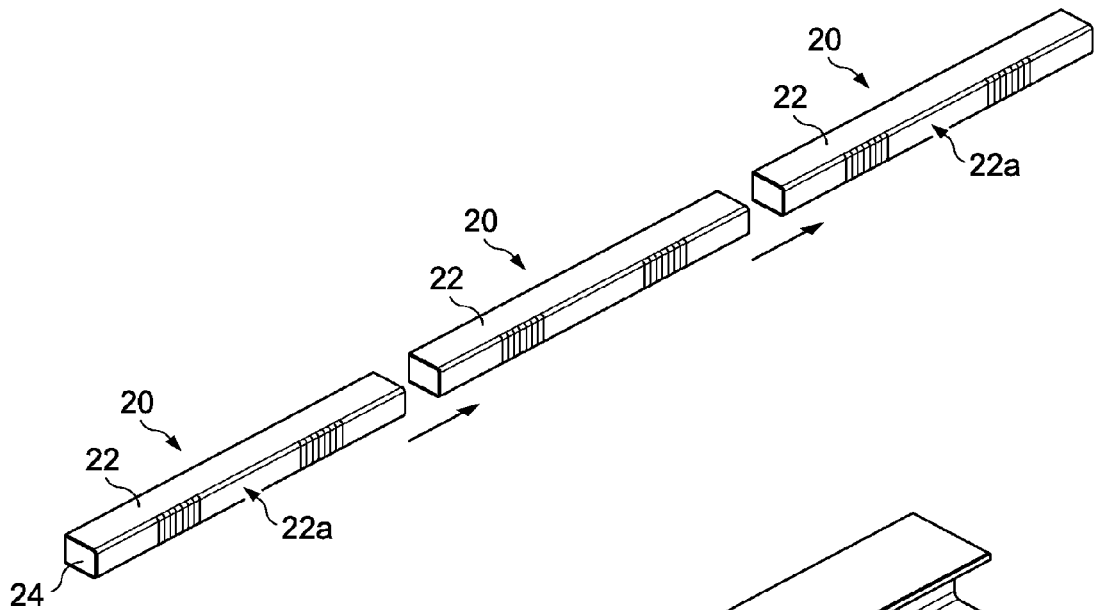
FIG. 5 is an illustration of a perspective view showing multiple mandrel sections that may be joined end-to-end to form a long, flexible mandrel.

FIG. 5 illustrates an alternate embodiment in which multiple channel members 22a are connected together end-to-end and assembled with an inner core 24 to form a single, long flexible mandrel 20 that may be used, for example, to form long stringers (not shown in FIG. 5) used in the aircraft industry. The channel members 22a may be joined together using butt joints (not shown), for example, by welding the adjacent ends of the channel members 22a together, however other types of joints may be used. Once a single, long metal sleeve 22 has been formed using multiple channel members 22a, it may be filled with a suitable filler material as described previously, to form a single, continuous inner core 24. Alternatively, the inner core 24 may be formed as by molding and/or machining a material such as carbon foam which is then assembled with the metal outer sleeve 22. It may also be possible to join the channel sections 22a together to form a single long sleeve 22, and then insert a single long core 24 into the sleeve 22.

The lightweight, flexible mandrel shown in FIGS. 1-4 may be used to layup, compress and/or cure a wide variety of parts having varying configurations and geometries. For example, referring now to FIGS. 6 and 7, a pair of the lightweight, flexible mandrels 20a, 20b may be form a tool assembly 40 used to fabricate a stringer having a substantially I-shape cross section and including a web 44 and a pair of flanges 46, 48. The stringer 42 may be laid up using prepreg composite plies and conventional drape forming techniques. For example, a pair of U-shaped members (not shown) can be laid up and joined together back-to-back, along with caps (not shown) and radius filler noodles (not shown) to form the I cross sectional shape shown in FIG. 7. The tool assembly 40 along with the composite layup stringer 42 layup may be vacuum bagged, compacted and cured using a process and equipment similar to that disclosed in U.S. Pat. No. 7,901, 531, the entire contents of which are incorporated by reference herein. In the illustrated embodiment, the stringer 42 has a pair of Radii $R_2$ between the web 44 and the flanges 46. The Radii $R_2$ are formed and compacted by the radiused edges 28 on the flexible mandrels 20a, 20b. In the example shown in FIG. 7, only one of the mandrels 20a has slots 30 along a portion of its length, however in other embodiments, both of the mandrels 20a, 20b may have one or sets of slots 30 therein which render these portions inwardly flexible.

Figure 6:
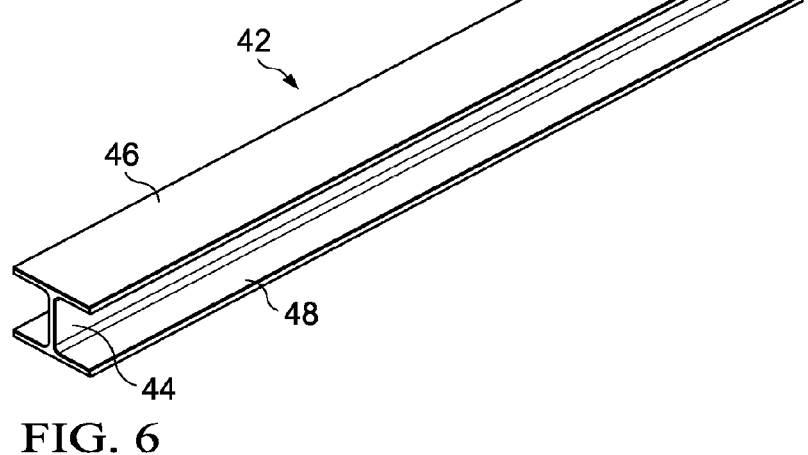
FIG. 6 is an illustration of an I-stringer fabricated using the disclosed lightweight flexible mandrel.
Figure 7:
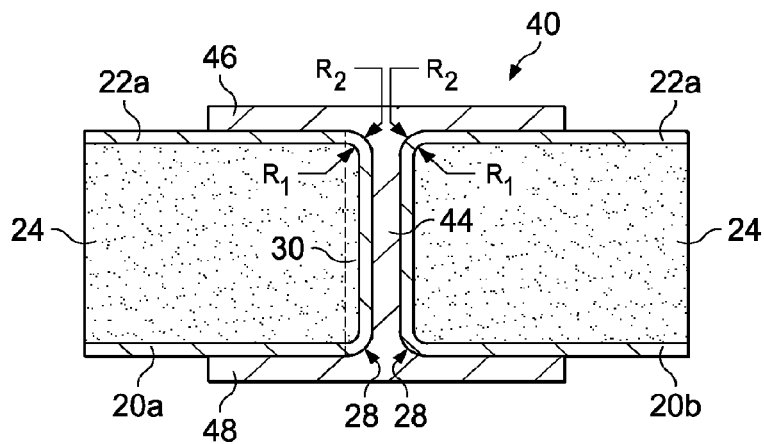
FIG. 7 is an illustration of a cross sectional view showing the use of a pair of the disclosed mandrels to form the I-stringer shown in FIG. 6.
Figure 8:
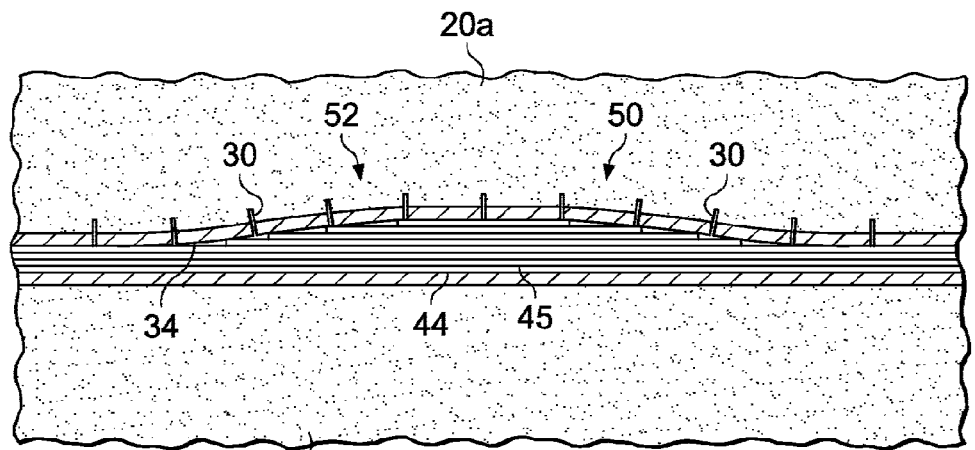
FIG. 8 is an illustration of a sectional view taken through the web of the stringer shown in FIG. 6, showing a ply pad-up accommodated by flexing of one of the mandrels shown in FIG. 7.

Referring now concurrently to FIGS. 6-8, the stringer 42 may include one or more contours along its length. For example, referring particularly to FIG. 8, the web 44 may comprise a plurality of ply laminations 45 that include a contour 52 to which the mandrel 20a must conform. The contour 52 is formed by ply pad-ups 50. As a result of the slots 30 in the sidewall 34 of mandrel 20a, the sidewall 34 flexes when compressed against the web 44 during layup compaction and/or curing, and assumes the shape of the contour 52.

Figure 9:
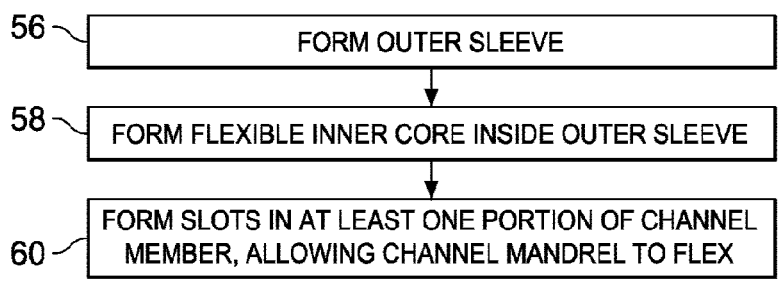
FIG. 9 is an illustration of a flow diagram showing the steps of a method of fabricating the disclosed flexible mandrel.
Figure 10:
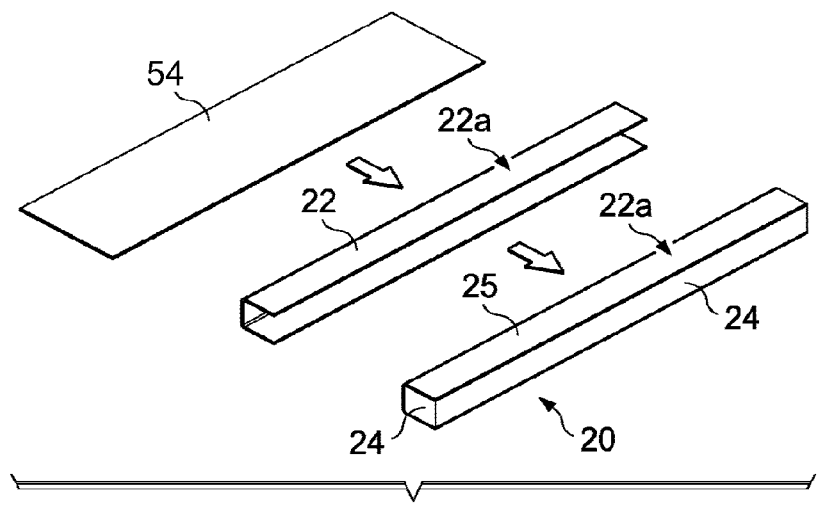
FIG. 10 is an illustration of a perspective view showing progressive stages of one embodiment of the disclosed fabrication method.

Referring now to FIG. 9, the lightweight, flexible mandrel 20 may be fabricated by forming an outer sleeve 22 at step 56, and forming a flexible inner core 24 inside the sleeve 22 at 58. At step 60, slots 30 are formed in at least a portion 26 of the outer sleeve 22, allowing the mandrel 20 to flex and conform to contours of a part being processed. The slots 30 may be formed by any suitable process, such as, for example and with limitation, machining the slots 30 using a wire EDM (electro-discharge machining) machine (not shown). However, other types of metal working processes may be used to form relatively narrow slots 30, including but not limited to other types of machining, cutting and milling. Relatively narrow slots 30 may be desirable in some applications in order to minimize mark-off in the formed part. FIG. 10 shows one technique for forming the outer sleeve 22. The technique may begin by providing substantially flat sheet 54 of metal. Next the metal sheet 54 is formed by any suitable process into an elongate channel member 22a having a U-shaped cross section. Normally, the surface of the channel member 22a will be sufficiently smooth to impart a smooth finish to the surface of the part, and not need to be machined to improve the tool surface finish. However, for some applications it may be desirable to machine or otherwise treat the surface of the channel member 22a. In another embodiment of the method, it may be possible to extrude the channel member 22a from a suitable metal. The slots 30 may be formed in the channel member 22a either before or after the inner core has been placed or form within the channel member 22a.

Step 58 of the method shown in FIG. 9 may be performed using any of several alternate techniques. In one technique, the cavity 23 within channel member 22a may be filled with a suitable, lightweight polymer material, such as a structural foam that assumes the internal shape of the cavity 23 (FIG. 3) and is subsequently cured. Alternatively, a block (not shown) of high temperature structural foam, such as a carbon foam, may be molded or cut to size and then inserted within and bonded to the channel member 22a. When fabricated separately and then inserted into the channel member 22a, the inner core 24 need not be machined, but rather need only be cut to an approximately size that fits within and substantially fills the inner cavity 23 of the channel member 22a.

Figure 11:
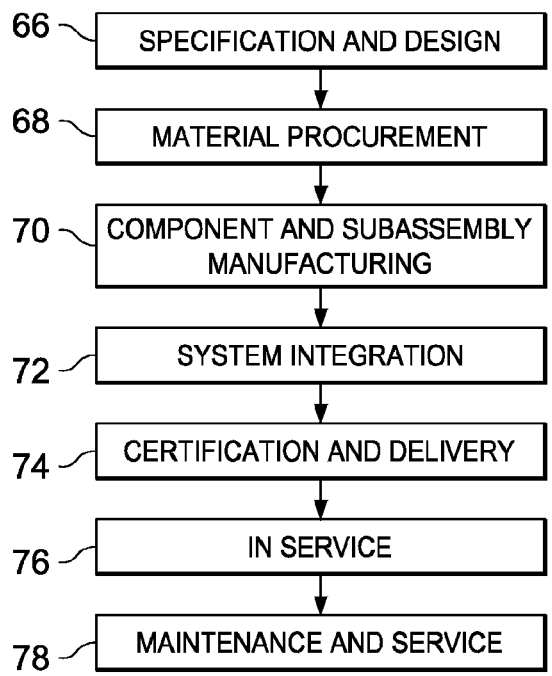
FIG. 11 is an illustration of a flow diagram of aircraft production and service methodology.
Figure 12:
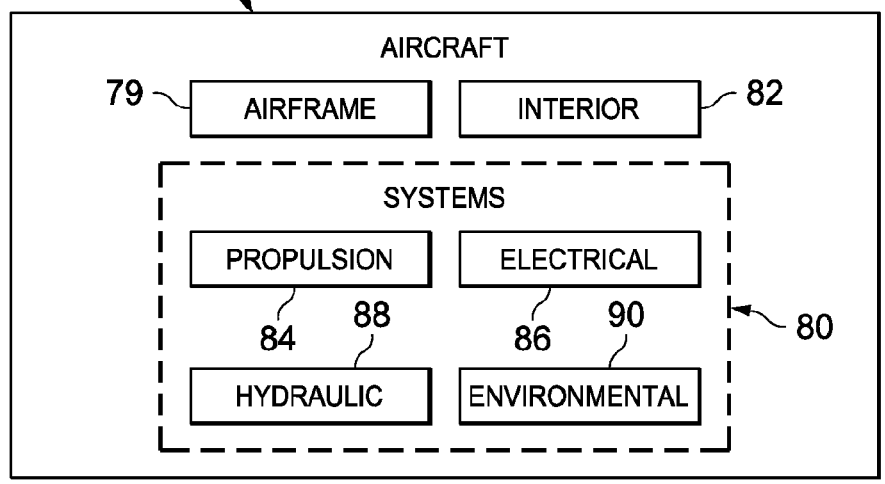
FIG. 12 is an illustration of a block diagram of an aircraft.

Embodiments of the disclosure may be employed, without limitation, in the context of aircraft manufacturing and service method 62 as shown in FIG. 11 and an aircraft 64 as shown in FIG. 12. During pre-production, aircraft manufacturing and service method 62 may include specification and design 66 of aircraft 64 in FIG. 12 and material procurement 68.

During production, component and subassembly manufacturing 70 and system integration 72 of aircraft 64 in FIG. 12 takes place. Thereafter, aircraft 64 in FIG. 12 may go through certification and delivery 74 in order to be placed in service 76. While in service 76 by a customer, aircraft 64 in FIG. 12 is scheduled for routine maintenance and service 78, which may include modification, reconfiguration, refurbishment, and other maintenance or service.

Each of the processes of aircraft manufacturing and service method 62 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft 64 is depicted in which an advantageous embodiment may be implemented. In this example, aircraft is produced by aircraft manufacturing and service method 62 in FIG. 1 and may include airframe 79 with plurality of systems 80 and interior 82. The disclosed mandrel may be used to fabricate various structural components of the airframe 79, such as stringers Examples of systems 80 include one or more of propulsion system 84, electrical system 86, hydraulic system 88, and environmental system 90. Any number of other systems may be included. Although an aircraft example is shown, different advantageous embodiments may be applied to other industries, such as the automotive and marine industries.

Apparatuses and methods embodied herein may be employed during at least one of the stages of aircraft manufacturing and service method 62 in FIG. 11. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 70 in FIG. 11 may be fabricated or manufactured in a manner similar to components or subassemblies produced while aircraft 64 is in service in FIG. 11. As yet another example, a number of apparatus embodiments, method embodiments, or a combination thereof may be utilized during production stages, such as component and subassembly manufacturing 70 and system integration 72 in FIG. 11. A number, when referring to items, means one or more items. For example, a number of apparatus embodiments is one or more apparatus embodiments. A number of apparatus embodiments, method embodiments, or a combination thereof may be utilized while aircraft 64 is in service 76 and/or during maintenance and service 78 in FIG. 12. The use of a number of the different advantageous embodiments may substantially expedite the assembly of and/or reduce the cost of aircraft 64.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A mandrel for processing a part, comprising:
an outer sleeve having at least one flexible portion along its length allowing the sleeve to flex to a desired contour; wherein the outer sleeve is formed of a metal; and
wherein the outer sleeve has a side defining a tool face and is provided with a plurality of slots therethrough allowing the tool face to flex along the flexible portion of the sleeve, and
a generally flexible inner core within the sleeve;
wherein the inner core is a lightweight polymer and substantially fills the outer sleeve, and wherein the lightweight polymer has sufficient strength to react to forces applied to the outer sleeve.

2. The mandrel of claim 1, wherein the outer sleeve has a cross section that is substantially U-shaped.

3. The mandrel of claim 1, wherein the inner core includes one of a structural foam and an elastomer.

4. The mandrel of claim 1, wherein:
the outer sleeve includes at least 3 sides, and
the flexible portion of the sleeve includes a plurality of spaced apart, generally parallel slots in one of the sides of the outer sleeve.

5. The mandrel of claim 4, wherein the side having the slots therein is connected to the other two of the three sides by a pair of radiused edges.

6. The mandrel of claim 1, further comprising:
a plurality of the outer sleeves connected together end-to-end.

7. A lightweight, flexible mandrel for use in fabricating a composite part, comprising:
an elongate metal channel member having outer sides on which a composite part layup may be placed, the channel member having a substantially U-shaped cross section defining an internal cavity and a plurality of slots in one of the sides allowing the side to flex to a desired contour; and
a generally flexible inner core substantially filling the internal cavity of the channel member and structurally supporting the sides of the channel member.

8. The lightweight, flexible mandrel of claim 7, wherein the metal channel member is made from an alloy comprising nickel and iron.

9. The lightweight, flexible mandrel of claim 7, wherein the inner core includes one of a structural foam, an elastomer and a composite laminate.

10. The lightweight, flexible mandrel of claim 7, wherein the slots extend only along a portion of the length of the side having the slots therein.

11. The lightweight, flexible mandrel of claim 7, wherein the side having the slots therein is connected to the other of the sides by radiused edges and the slots extend through the radiused edges.

12. A method of fabricating a flexible mandrel for processing a part, comprising:
forming an outer sleeve;
locating a flexible core inside the outer sleeve; and
forming slots in the outer sleeve along at least a portion of the sleeve's length that allow the sleeve to flex to a desired contour, wherein forming the flexible core inside the outer sleeve includes cutting a block of structural foam to size, inserting the foam block in the outer sleeve, bonding the foam block to the outer sleeve, filling the sleeve with a polymer filler, and curing the polymer filler.

13. The method of claim 12, wherein forming the outer sleeve includes forming a metal into an elongate channel member.

14. The method of claim 12, wherein forming the outer sleeve includes extruding a channel member formed from the metal.

15. The method of claim 12, wherein forming the slots is performed using wire EDM to cut the slots in the outer sleeve.

* * * * *